G. B. TAYLOR.
CERTAIN KIND OF SPIRAL CHUCKS.
APPLICATION FILED NOV. 21, 1910.
990,172.
Patented Apr. 18, 1911.
2 SHEETS—SHEET 1.
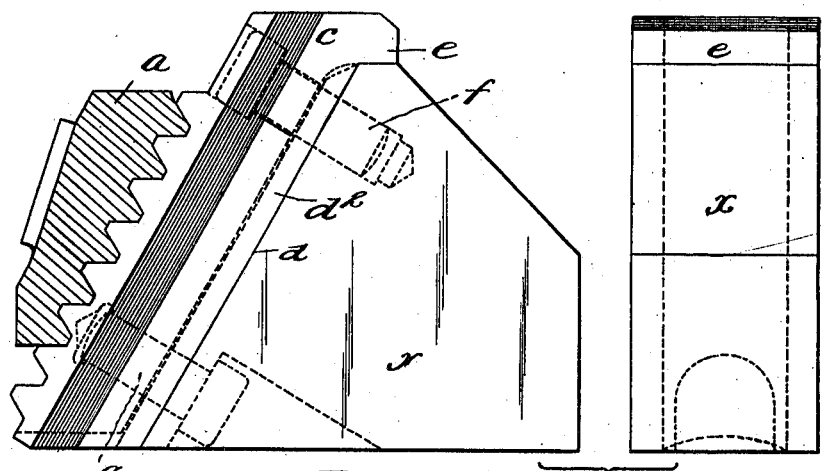
Fig. 1.
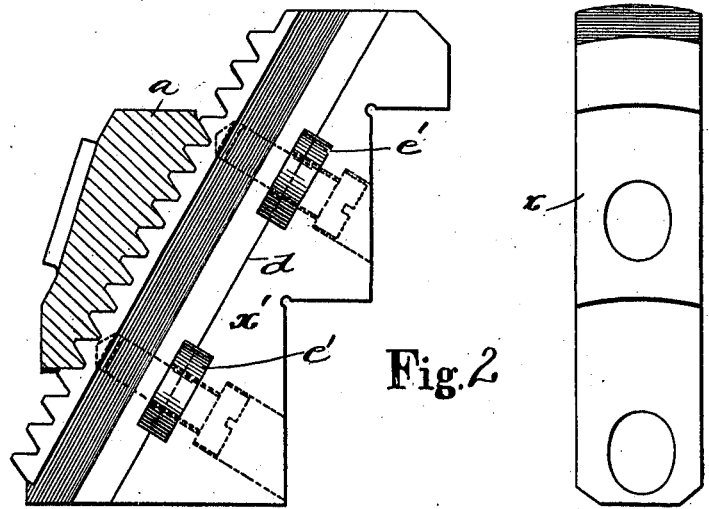
Fig. 2.
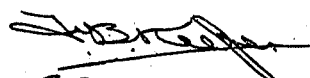
Witnesses:
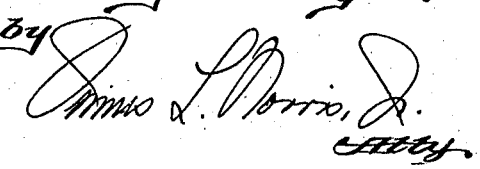
Inventor
George B. Taylor
by
Atty.

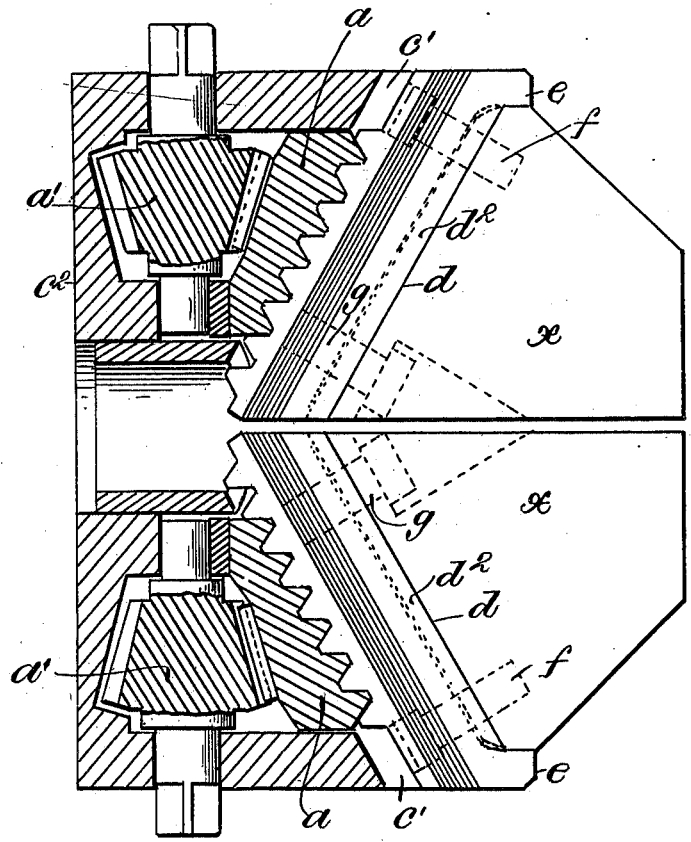

UNITED STATES PATENT OFFICE.

GEORGE BENJAMIN TAYLOR, OF BIRMINGHAM, ENGLAND.

CERTAIN KIND OF SPIRAL CHUCKS.

990,172.

Specification of Letters Patent. Patented Apr. 18, 1911.

Application filed November 21, 1910. Serial No. 593,585.

*To all whom it may concern:*

Be it known that I, GEORGE BENJAMIN TAYLOR, a subject of the King of Great Britain, residing at Bartholomew Street, Birmingham, in the county of Warwick, England, have invented certain new and useful Improvements in Certain Kinds of Spiral Chucks, of which the following is a specification.

The present invention relates distinctly and solely to a certain type of spiral chuck now almost universally known as the "Taylor spiral chuck." This type of chuck has a hollow conical face provided with axially inclined ways in which the gripping jaws are slidably mounted, said jaws being connected with a revoluble spirally screw-threaded ring by which they are collectively operated. Such a construction of chuck is described in British Patent No. 14146 of 1887. In this type of chuck, and in other types such as the "scroll chuck" or "volute chuck," it has hitherto been proposed to fit to the jaws, or jaw carriers, detachable false jaws to make the chuck adaptable to greater variety of work; in particular, in a spiral chuck (the present invention relates only to that type of chuck), false jaws have been attached to those faces of the jaws proper which are at right angles to the axis, as shown and described in British Patent No. 86 of 1903.

This invention is distinguished by the attachment of the jaws to jaw carriers which work in the inclined ways, in such manner that the contacting and abutting faces of the carriers and the jaws are arranged obliquely to the axis of the chuck, whereby the gripping stresses are distributed over the jaw carriers and substantially throughout the entire ways in the chuck body, so as to prevent undue strains upon the said ways and to maintain greater accuracy in self-centering.

In one arrangement of the invention, the jaw carriers, which move in the ways and gear with the revoluble ring, have their front faces disposed at an angle approximately parallel with the jaw ways, and the jaws have corresponding faces to contact and abut solidly and squarely against these faces, suitable means being provided between the carriers and the jaws to rigidly connect the same.

A structural embodiment of the invention is illustrated in the accompanying drawings, wherein—

Figure 1 represents a side view and an end view of one form of the combined carrier and jaw; Fig. 2 represents similar views of a slight modification; and Fig. 3 is a transverse sectional view of the chuck complete.

In said drawings $a$ indicates the spirally screw-threaded ring, and $c$ the jaw carriers, which carriers gear with said ring in the well known manner and also slide in the inclined ways $c'$ in the face of the chuck body $c^2$. Ring $a$ is rotated by either of the pinions $a'$.

With reference to Fig. 1, $d$ indicates the contacting faces of the jaw $x$ and the jaw carrier $c$, which faces are set at an angle parallel with the direction of movement of the jaw carrier in its ways, and $e$ indicates a thrust abutment formed by a step located upon the upper end of the jaw carrier, said step projecting outwardly across the correspondingly shaped end of said jaw. The faces $d$, as will be seen, extend approximately the full length of the carrier and jaw, and therefore the thrust or stress due to the gripping action is evenly distributed throughout the entire length of said carrier and way. The effective engagement of the contacting faces $d$ may be improved by a groove or tenon arrangement, as indicated at $d^2$, while the attachment of the jaw to the carrier with the faces $d$ and the abutment surfaces $e$ in contact is effected by the clamping pins $f$ and $g$. The thrust abutment $e$ also has the obvious effect of relieving the shearing strains on said pins.

In the form shown in Fig. 2 a stepped jaw $x'$ is employed, the angle of the contacting faces $d$ being the same as that in Fig. 1. The abutment $e'$ is constituted, in this instance, by steel disks or the like, which are fitted in mating recesses in the adjacent faces of the carrier and jaw.

I claim as my invention:

1. A spiral chuck comprising, in combination, a body having a conical face provided with axially inclined ways; spirally toothed carriers adapted to slide in said ways; a detachable gripping jaw rigidly secured to each carrier and having one of its faces contacting squarely against a face of the latter throughout substantially the entire extent thereof, said contacting faces being arranged parallel with the direction of movement of said carrier in said way and obliquely to the axis of the chuck, to distribute the gripping stress evenly over said carrier and said way; and a spirally toothed ring operatively engaged with the teeth of said carriers.

2. A spiral chuck comprising, in combination, a body having a conical face provided with axially inclined ways; spirally toothed carriers adapted to slide in said ways; a detachable gripping jaw associated with each carrier and having one of its faces contacting squarely against a face of the latter throughout substantially the entire extent thereof, said contacting faces being arranged parallel with the direction of movement of said carrier in said way and obliquely to the axis of the chuck, to distribute the gripping stress evenly over said carrier and said way; means rigidly connecting each carrier and the corresponding jaw for holding said faces in such contact; means associated with each carrier and engaging the said corresponding jaw for relieving the shearing action upon said connecting means; and a spirally toothed ring operatively engaged with the teeth of said carriers.

In testimony whereof I affix my signature in presence of two witnesses.

GEORGE BENJAMIN TAYLOR.

Witnesses:
GEO. FUERY,
FRANCIS BINNS.

Copies of this patent may be obtained for five cents each, by addressing the "Commissioner of Patents, Washington, D. C."